3,661,775
PROCESS FOR DEIONIZING WATER
Akimitsu Miyahara, Kawagoe, Minoru Fujita, Tokyo, Isao Yamamoto, Chiba, and Tamako Katamura, Tokyo, Japan, assignors to Rohm and Haas Company, Philadelphia, Pa.
Filed July 1, 1970, Ser. No. 51,468
Int. Cl. C02b 1/68
U.S. Cl. 210—37
4 Claims

ABSTRACT OF THE DISCLOSURE

This invention involves a 3-bed ion exchange water deionization system. The first bed contains a strongly acidic cation exchange resin; the second bed contains a weakly basic anion exchange resin; and the third bed contains a strongly basic anion exchange resin. Water to be deionized is passed down through the first column. The effluent is divided into two parts, the major portion being made to pass down through the second or weakly basic resin and, eventually, through the third column containing the strongly basic resin. The minor portion of the effluent from the cation exchange bed is mixed together with the effluent from the weakly basic resin bed and then sent down through the strongly basic resin bed. The effluent from the third column or strongly basic resin bed is the deionized water.

---

This invention relates to the deionization of water by treating it with a sequence of one or more acidic cation exchange resins followed by weakly basic and then strongly basic anion exchange resins. It has particular reference to an improvement in the manner in which the weakly and strongly basic anion exchange resins are used, the effluent from the cation exchange resin bed being divided so that a major part passes through the weakly basic anion exchange resin and then is mixed with the remainder of the cation exchange bed effluent preparatory to passing down through the strongly basic anion exchange resin bed. The net result is a saving of at least about 10 percent of the anion exchange resin volume required for a given sample of water, and a proportionate saving of the regenerant required for the resin.

Figure 2:
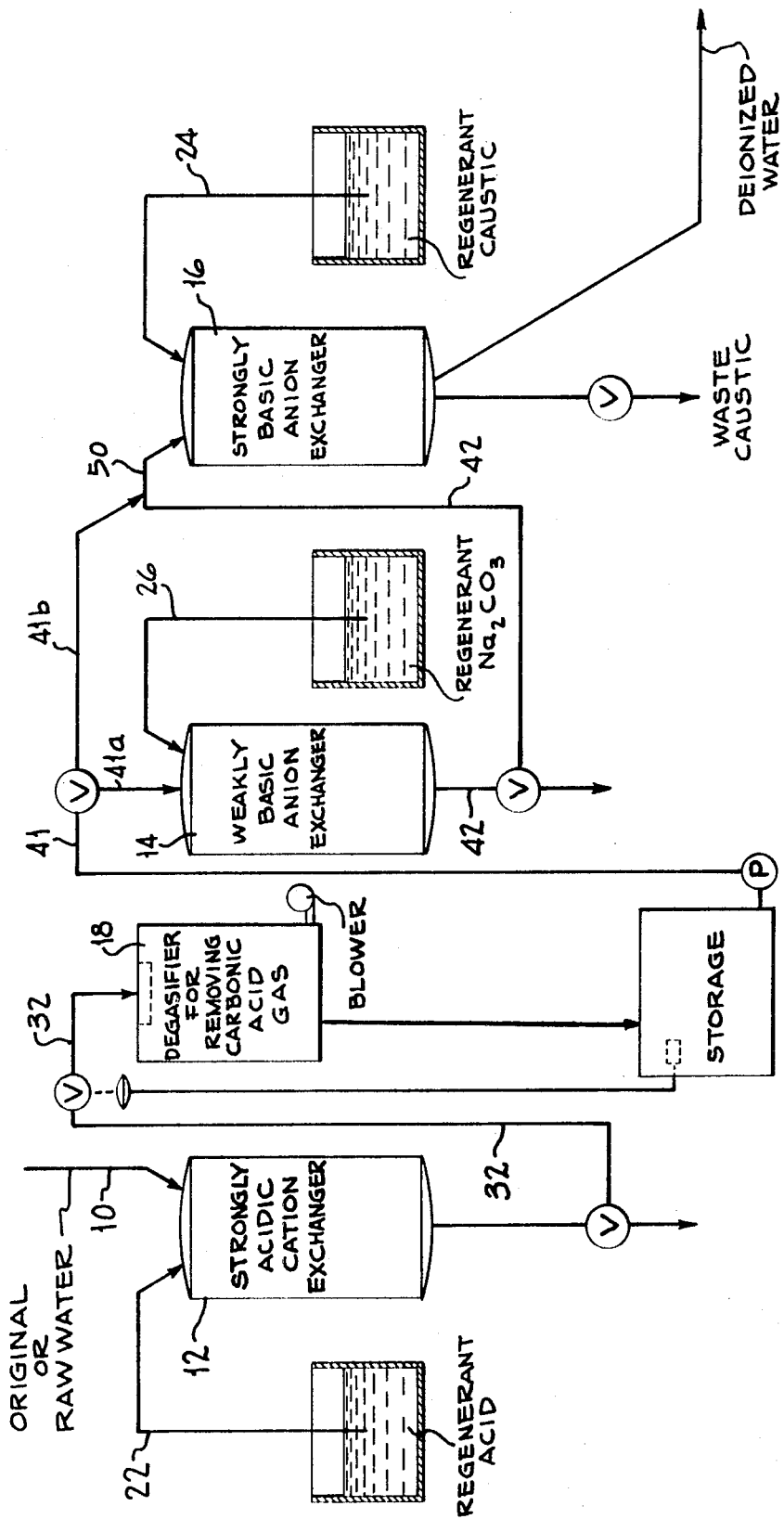
FIG. 2 is an illustration of a typical three-bed water deionization system utilized to practice the method of this invention.

In a typical water deionization system, such as the three-bed apparatus depicted in the schematic diagram of FIG. 2, raw water is first passed, as indicated at 10, through a strongly acid cation exchanger 12 to remove such cations as the calcium magnesium and sodium ions, which generally are present, by exchanging them for hydrogen. The salts of these cations are thus converted to their respective acids. Silicates in the water are converted to silicic acid. By passing these products through anion exchangers 14 and 16, these various acids are removed, as will be explained below.

The effluent from the cation exchange treatment also contains carbonic acid which likewise is removed. If done by mechanical aeration, the succeeding anion exchangers are relieved of the burden which this additional influent acid concentration would impose. It is thus preferable to use a degasifier or decarbonator 18 either before the weakly basic anion exchange resin unit 14 (as shown in the drawing), or between that unit and the succeeding strongly basic anion exchanger resin unit 16. Since the weakly basic anion exchange resin does not adsorb any appreciable quantities of $CO_2$ or carbonic acid, it is a matter of choice whether to locate the decarbonator in the system before or after the weakly basic unit, the important thing being to incorporate it ahead of the strongly basic anion exchanger. This will assure that the latter's ion exchange capacity is not used up to any appreciable degree in the removal of the carbonic acid, consequently avoiding the necessity for increasing the amount of caustic required for its regeneration.

The effluent from the cation exchange unit, whether or not is has already been passed through a degasifier, next goes into the weakly basic anion exchanger where chlorides and sulfates are removed from the water. The effluent then goes through the strongly basic anion exchange unit where the silicic acid and traces of $CO_2$ are adsorbed. The last named unit, incidentally, may consist wholly of strongly basic anion exchange resins or, following accepted optional commercial practice, may consist of a mixed bed of strongly basic anion and acidic cation exchange resins.

The cation exchanger, which typically may be a sulfuric type resin such as Amberlite IR-120, is regenerated with a mineral acid as indicated at 22 in the drawing. Optionally, the cation exchanger can be a two-bed unit in series, the first bed consisting of a carboxylic type resin such as Amberlite IRC-50, followed by a second bed of Amberlite IR-120. The weakly basic anion exchanger, which typically may be a polyamine type resin such as Amberlite IR-45, may be regenerated with sodium carbonate. The strongly basic anion exchanger, hereinafter referred to as Type I strongly basic anion exchange resin, has trialkylammonium functional groups such as trimethylammonium, dimethylethyleneammonium or triethylammonium groups. Examples of Type I resins are Amberlite IRA-400 and Amberlite IRA-402. All of these resins, incidentally, are commercially available products manufactured by the Rohm and Haas Company, Philadelphia, U.S.A.

Regeneration of the strongly basic anion exchange resin is done with caustic soda as indicated at 24. Regeneration of the weakly basic anion exchange resin is done with sodium carbonate as indicated at 26.

The described prior art system of deionization and resin regeneration has been generally satisfactory in the sense that it has made possible the most useful and economical treatment of boiler feed water and the like which has heretofore been known. By that system, water hardness is reduced to a minimum, the bicarbonate or carbonate alkylinity is reduced to a minimum, the carbon dioxide content in the stream is reduced to prevent condensate system corrosion and to prevent carryover from the boiler, and silica is reduced to prevent the formation of silica scale in the boiler. This last is particularly important in the case of steam turbines, a very critical problem in the operation of power plants because such deposits reduce the efficiency of the turbines and make it necessary to shut the turbines down for a descaling operation.

Shutdowns of power plants are expensive since the plants lose their capacity or the use of spare units is made necessary. Prevention of silica deposits in the turbines can only be accomplished by reducing the amount of silica in the steam which feeds the turbines. This in turn requires the manufacture of low concentrations of silica in the concentrated boiler salines inasmuch as silica in the steam is a direct function of silica in the boiler salines. Such low concentrations can be partly attained by increased boiler blowoff. But in many cases the make-up feedwater may contain such high amounts of silica that the blowoff becomes excessive. Then treating the feedwater to reduce its silica content becomes essential.

At least three prior art methods of silica removal are known and are aptly described in U.S. Pat. 2,807,582. One is the deionization or demineralization treatment described above; a second is a hot lime zeolite treatment; and a third involves a cold process split stream hydrogen-sodium zeolite plant, followed by a degasifier treatment and then treatment by anion exchange units in the hydroxide form which is partially neutralized with acid to control the water's pH before going into a boiler. Another method of silica removal is described in U.S. Pat. 3,197,401. It broadly consists in diluting the reclaimed regenerant caustic with some of the original, raw deionized or acidic softened water, then passing the diluted regenerant into the weakly basic anion exchanger.

While the described prior art methods are possibly highly effective for their intended purposes, the present invention constitutes an important improvement over each of them in that it makes possible the use of a smaller amount of the weakly basic anion exchange resin in order to deionize water having a given silica composition and, of course, this further results in the use of a smaller amount of the regenerant required for the weakly basic resin. Furthermore, the concentration of residual silica in the final deionized water effluent from the system of the present invention is materially less than that found in the conventional three-bed system of water deionization.

Figure 1:
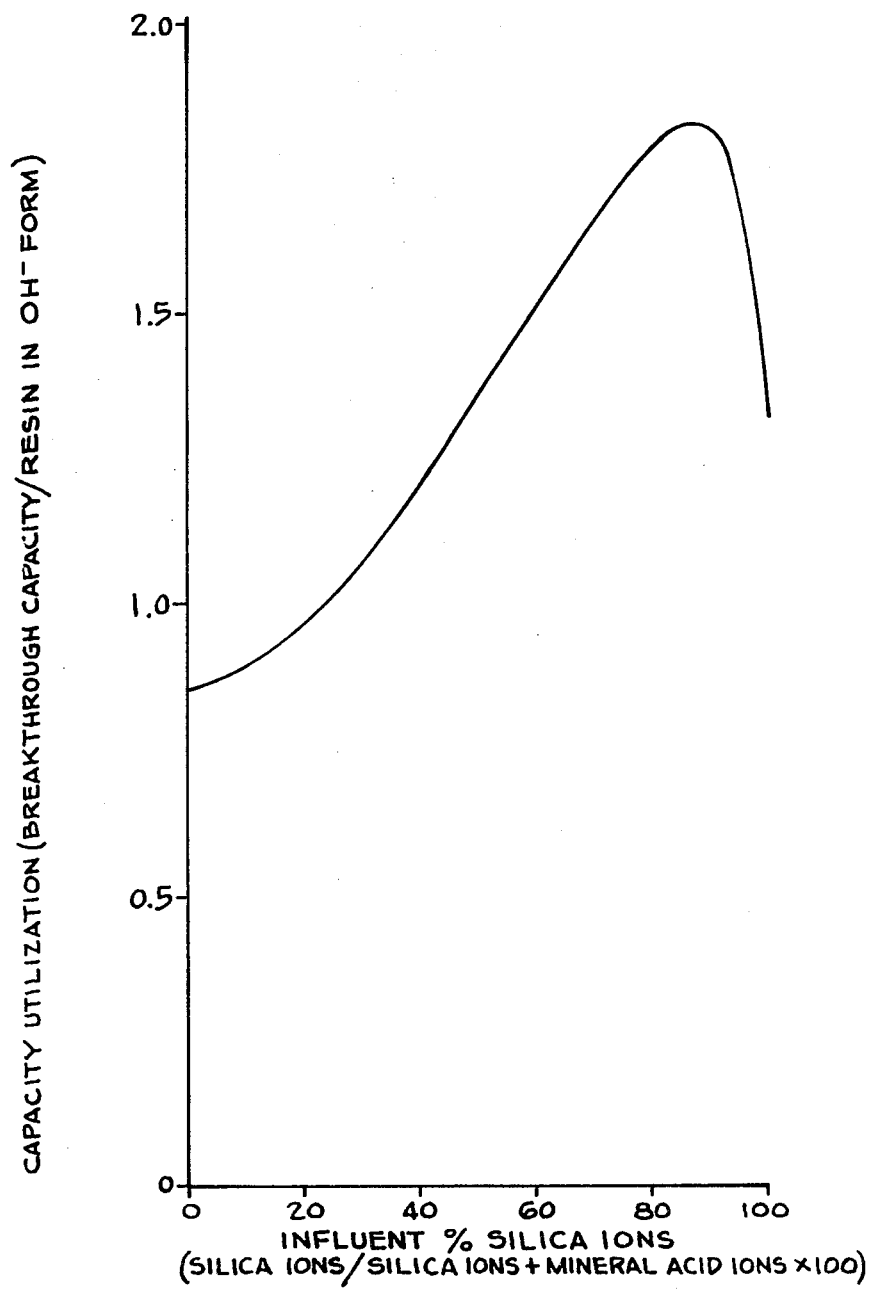
FIG. 1 is an illustration of the silica ion exchange capacity for a typical Type I anion exchange resin.

A key to the underlying principle of the present invention is the fact that Type I strongly basic anion exchange resins ($OH^-$) are capable of adsorbing silica ions in water very effectively, and that such resins have an exceptionally high capacity for silica ions. This is illustrated in FIG. 1, which shows the utilization of the ion exchange capacity of a typical Type I resin, namely, Amberlite IRA–402. As used herein reference to the term "utilization of ion exchange capacity" means the breakthrough capacity per unit volume of the Type I resin (meq./liter resin) divided by the quantity of hydroxide ion exchange groups per unit volume (meq./liter) of the resin in the regenerated (hydroxide) form. In other words, when all the hydroxide ion exchange groups in the resin are exhausted by an equivalent quantity of ions, the capacity utilization is 1.

Another key to the present invention is the fact that a maximum capacity utilization of the resin is attained, as will be seen from FIG. 1, when the percent ratio of silica to total anions in the influent partially treated (not raw) water (50 in FIG. 2) ranges approximately from 80 to 90%. This phenomenon is attributable to the fact that one ion exchange group of the Type I resin is capable of adsorbing more than one silica ion. Another reason for this phenomenon is the fact that even when the ion exchange groups which have been exhausted with silica ions come into contact with chloride ions, with the resultant replacement of silica ions by chloride ions, most of the silica ions thus liberated remain inside the resin particles, with only a small part of the liberated silica ions diffusing out of the resin particles. We have also determined that when Type I resin impregnated with uncombined silica is regenerated, the uncombined silica is eluted very easily by an alkali solution. Thus, the regenerant requirement for obtaining a given quantity of hydroxide groups in the Type I resin is almost the same whether or not the resin contains uncombined silica.

The just described phenomena are obtainable only with the use of Type I resins. Other strongly basic anions, such as the Type II resins which have alkyloxyalkyl-ammonium functional groups such as dimethyl-2-oxyethyl-ammonium groups. Such resins are available commercially as Amberlite IRA–401 and Dowex 2. They possess lower basicities and, therefore, have lower capacities for silica adsorption than do the Type I resins.

In the conventional three-bed water deionization system, described above, silica ions account for almost 100% of the anions adsorbed by the strongly basic anion exchange resin. In this case, even when a Type I resin is used the utilization of its capacity is but 1.3 as seen in FIG. 1. The capacity utilization is still lower than this value when a Type II resin is used. These facts clearly indicate that with the conventional three-bed water deionization system, no advantage can be taken of the previously described special feature of the Type I resin. By sharp contrast, the three-bed system of the present invention does make possible the use of that feature to obtain a measurable improvement in the deionization process, as will now be explained.

As an illustration, a raw feed water 10 to be deionized is used which contains monovalent cations such as sodium and potassium ions, divalent cations such as magnesium and calcium ions, mineral acid anions such as chloride and sulfate ions, bicarbonate ions, and silica ions. Such a raw water is first passed through a column 12 which is charged with the strongly acidic cation exchange resin Amberlite IR–120 ($H^+$) in order to exchange hydrogen ions in the resin for cations in the raw water. If necessary, or desired, the effluent 32 from column 12 is passed through degasifier 18 in order to remove carbon dioxide.

A major portion (i.e., at least one-half) of the acidic softened water 32, or 41 if degasified) containing silica ions and mineral acid ions is next passed through a weakly basic anion exchange resin column 14 as shown at 41$a$ in FIG. 1. The resin in column 14 may typically be Amberlite IR–45 (free base form) which previously has been regenerated with an alkali solution to remove mineral acid ions. The remainder of the acidic softened water 32 or 41 is passed, as shown at 41$b$, to the strongly basic anion exchange column 16. Enroute, the water stream 41$b$ is caused to mix with the effluent 42 from the weakly basic exchanger 14 so as to form a mixed stream 50 which is directly down through the strongly basic anion exchanger 16.

By regulating the amount of the acidic softened water stream 41$a$ which is passed down through column 14, and the amount of the stream 41$b$ of that same water which is made to by-pass column 14, the ratio of silica ions/mineral acid ions in the mixed water stream 50 is adjusted to a range of from 6/4 to 9.8/0.2. Preferably, the adjustment is made to within a range of from 8.0/2.0 to 9.5/0.5. The effluent which issues from column 16 is a highly purified, deionized water product.

When the water deionization process is carried out in the manner just described, so that the ratio of silica ions/mineral acidic ions in the influent to column 16 becomes, e.g. 9/1, as shown in FIG. 1, the utilization of ion exchange capacity of the resin is 1.8. This capacity utilization is quite high, especially when compared with a capacity utilization value of 1.3 which is achieved when the influent's anionic constituents comprise almost 100% silica ions, as is the normal situation in the conventional three-bed water deionization system. Another advantage of the present invention over the prior art method resides in the quantity of silica ions adsorbed per unit exchange capacity of the Type I resin.

In summary, the present invention has the particular advantage over the conventional process of making possible a reduction in the quantity of weakly basic anion exchange resin equivalent in volume to the amount of water having a given silica composition which by-passes that resin and goes directly to the strongly basic anion exchange resin column. Additionally, less Type I resin is needed, and, concomitantly, the amount of the regenerant required is decreased despite the fact that the regenerant efficiency of the Type I resin is low as compared to that realized in the conventional method because in the present process some of the mineral acid ions are adsorbed on the resin.

These advantages of the present invention are graphically illustrated in Table I which reflects data obtained using a Type I resin (Amberlite IRA–402) regenerated at a level of 250 g. NaOH/liter resin.

TABLE I

| | New 3-bed system | Conventional 3-bed system |
|---|---|---|
| Ratio of silica ions/ mineral acid ions in the influent. | 9/1 | 9/0. |
| Resin converted to hydroxide form upon regeneration. | 1.04 eq./liter | 1.17 eq./liter resin. |
| Capacity utilization (cf. FIG. 1). | 1.8 | 1.3. |
| Breakthrough capacity | 93.5 g. as $CaCO_3$ per liter resin. | 76.0 g. as $CaCO_3$ per liter resin. |
| Ratio of influent anionic concentration. | 1.0 | 0.9. |
| Ratio of resin volume required. | $\left(\dfrac{1.0}{93.5}\right)/\left(\dfrac{0.9}{76.0}\right)=0.903$ | 1. |
| Effluent residual silica concentration. | 0.03 p.p.m. as $SiO_2$ | 0.06 p.p.m. as $SiO_2$. |

As seen from the data in Table I, in the production of a given quantity of deionized water, the new three-bed system provides approximately a 10% saving in the resin volume required and, therefore, an equivalent saving in the regenerant requirement for that resin. Furthermore, the new system compares favorably with the conventional system in terms of purity of the final effluent. The reduction of resin volume achieved results in a decrease in the rinse-water requirement, which in turn contributes to an increase in the resin saved (i.e., decrease in resin required) for both the weakly basic and the Type I resins, as well as the strongly acidic resin.

Another improvement made possible by the present invention is that in the production of deionized water of a given residual silica concentration the new system permits a reduction of the regeneration level of the Type I resin to a point much lower than is possible with the conventional system. This is shown in Table II where the Type I resin (Amberlite IRA–402) is used for the production of deionized water having a silica concentration of 0.05 p.p.m. as $SiO_2$.

TABLE II

| | New 3-bed system | Conventional 3-bed system |
|---|---|---|
| Ratio of silica ions/ mineral acid ions in the influent. | 9/1 | 9/0. |
| Regeneration level required for obtaining deionized water containing 0.05 p.p.m. as $SiO_2$ of silica. | 160 g. NaOH per liter resin. | 280 g. NaOH per liter resin. |
| Resin converted to hydroxide form upon regeneration at above level. | 0.95 eq./liter resin | 1.15 eq./liter resin. |
| Capacity utilization (cf. FIG. 1). | 1.8 | 1.3. |
| Breakthrough capacity | 84.0 g. as $CaCO_3$ per liter resin. | 75.0 g. as $CaCO_3$ per liter resin. |
| Ratio of influent anionic concentration. | 1.0 | 0.9. |
| Ratio of resin volume required. | $\left(\dfrac{1.0}{84.0}\right)/\left(\dfrac{0.9}{75.0}\right)=0.99$ | 1. |

As seen from the data in Table II, the new three-bed system of the present invention makes it possible to reduce the regeneration level (i.e., requirement for chemicals for regeneration) of the Type I strongly basic anion exchange resin by more than 40% in comparison with the conventional three-bed system. Furthermore, the volume of resin required for the new system is appreciably less than in the conventional system.

The details of operation of the present invention will readily be understood by reference to the flow chart in FIG. 2. Referring to the system there illustrated, the following examples will amply instruct in the operation of the invention.

EXAMPLE 1

The strongly acidic cation exchange resin bed is charged with Amberlite IR–120B ($H^+$). The weakly basic anion exchange resin bed 14 is charged with Amberlite IR–45 (free base form). The strongly basic anion exchange resin bed 16 is charged with Amberlite IRA–402 ($OH^-$). The volume and regeneration level of each resin are as follows:

| | Resin volume | Regeneration level |
|---|---|---|
| Amberlite IR–120B | 40.0 liters (Na form) | 350 g. of 33% HCl/liter resin. |
| Amberlite IR–45 | 12.5 liters (free base form). | Regenerant waste from Amberlite IRA–402. |
| Amberlite IRA–402 | 6.6 liters (Cl⁻ form) | 250 g. of NaOH/liter resin. |

A raw water 10, containing the following impurities was passed through the three-bed ion exchange system at a flow rate of 400 liters per hour, the water first going down through column 12 and then (as indicated at 32) down through degasifier 18:

P.p.m. as $CaCO_3$
Total cations _____ 220
Bicarbonate ions _____ 140
Mineral acid ions _____ 80
Silica ions _____ 55

Approximately 92.4% of the thus degasified, acidic, softened water 41 was passed through column 14 to remove mineral acid ions (as indicated at 41a). The effluent 42 therefrom was water which still contained silica. To this water was added (as shown at 41b) the remaining 7.6% of the degasified, acidic softened water which had been permitted to by-pass column 14. The thus mixed stream 50 had concentrations of silica ions and mineral acid ions of 55 p.p.m. as $CaCO_3$ and 6.1 p.p.m. as $CaCO_3$, respectively. (This means that the ratio of silica ions/mineral acid ions was 9/1.) The mixed water stream 50 then was passed through column 16 until the silica leakage in the effluent leaving column 16 reached a level of 0.1 p.p.m. as $SiO_2$. The result of this treatment was to obtain, up to this point of silica leakage, 10 m.³ of deionized water. The average residual silica concentration of the treated water was 0.03 p.p.m. as $SiO_2$. By comparison, a raw water of the same composition set forth above was passed, also at a flow rate of 400 liters per hour, through a conventional three-bed exchange system with the following resin volumes and regeneration levels (also being degasified as per the previously described treatment):

| | Resin volume | Regeneration level |
|---|---|---|
| Amberlite IR–120B | 40.0 liters (Na form) | 350 g. of 33% HCl/liter resin. |
| Amberlite IR–45 | 13.6 liters (free base form). | Regenerant waste from Amberlite IRA–402. |
| Amberlite IRA–402 | 7.4 liters (Cl⁻ form) | 250 g. of NaOH/liter resin. |

The result of this treatment was the production of 10 m.³ of deionized water as of the time when the silica leakage in the final effluent from column 16 reached a level of 0.1 p.p.m. as $SiO_2$. The average residual silica concentration of the treated water was 0.06 p.p.m. as $SiO_2$.

The foregoing comparative results indicate that when the Type I resin is regenerated at a level of 250 g. NaOH/liter resin for both cases the new three-bed system of the present invention is able to provide a given amount of deionized water with a saving in resin volume, in comparison with the case of the conventional three-bed system, of 1.1 liters (8.1%) for the weakly basic anion exchange resin and 0.2 liter (10.8%) for the Type I strongly basic anion exchange resin. This means that the three-bed system of the present invention is capable of achieving a saving of the regenerant caustic amounting to 10.8% in comparison with the caustic requirements for the conventional three-bed system. Furthermore, the new three-bed system makes possible a lower concentration of residual silica ions in the final effluent water, on the order of 0.03 p.p.m. $SiO_2$, in comparison with the concentration which results with the three-bed system.

EXAMPLE 2

In this example the same comparison was made as in Example 1, following the schematic diagram of FIG. 2. In the present invention the volume and regeneration level for each resin were as follows:

| | Resin volume | Regeneration level |
|---|---|---|
| Amberlite IR-120B | 40.0 liters (Na form) | 350 g. of 33% HCl/liter resin. |
| Amberlite IR-45 | 12.5 liters (free base form). | Regenerant waste from Amberlite IRA-402. |
| Amberlite IRA-402 | 7.1 liters (Cl- form) | 160 g. NaOH/liter resin. |

A raw water 10, containing the following impurities was passed through the above-mentioned three-bed ion exchange system at a flow rate of 400 liters per hour, the water first going down through column 12 and then (as indicated at 32) down through degasifier 18:

|  | P.p.m. as $CaCO_3$ |
|---|---|
| Total cations | 220 |
| Bicarbonate ions | 140 |
| Mineral acid ions | 80 |
| Silica ions | 55 |

Of the total volume of the acidic softened water leaving the degasifier 18, approximately 92.4% was passed through column 14 to remove mineral acid ions, the effluent water 42 therefrom containing only silica. To this water was added the remaining 7.6% of the acidic softened water which had by-passed (as indicated at 41b) column 14. The mixture of the two streams of water, indicated by 50 in FIG. 2, contains concentrations of silica ions and mineral acid ions of 55 p.p.m. as $CaCO_3$ and 6.1 p.p.m. as $CaCO_3$, respectively. (This means that the ratio of silica ions/mineral acid ions was 9/1.) That mixed water was then passed through column 16. As a result of this treatment, 10 m.$^3$ of deionized water was attained as of the time when the silica leakage in the final effluent from column 16 reached a level of 0.1 p.p.m. as $SiO_2$. (The average residual silica concentration of the treated water was 0.05 p.p.m. as $SiO_2$.)

For purposes of comparison, a raw water of the same impurities composition as above was passed, also at a flow rate of 400 liters per hour, though a conventional three-bed ion exchange system with the following resin volumes and regeneration levels:

| | Resin volume | Regeneration level |
|---|---|---|
| Amberlite IR-120B | 40.0 liters (Na form) | 350 g. of 33% HCl/liter resin. |
| Amberlite IR-45 | 13.6 liters (free base form). | Regenerant waste from Amberlite IRA-402. |
| Amberlite IRA-402 | 7.2 liters | 280 g. NaOH/liter resin. |

The result of this treatment was that 10 m.$^3$ of the deionized water was obtained as of the time when the silica leakage in the final effluent reached a level of 0.1 p.p.m. as $SiO_2$. The average silica concentration in the treated water was 0.05 p.p.m. as $SiO_2$.

The results of these comparative treatments indicated that in order to obtain a given amount of deionized water of a certain purity, i.e., silica concentration of 0.05 p.p.m. as $SiO_2$, the regenerant for the Type I strongly basic anion exchange resin in the new three-bed system of the present invention was 1.14 kg. NaOH per cycle (resin volume: 7.1 liters; regeneration level: 160 g. NaOH/liter resin), whereas the regenerant NaOH required for the same resin in the conventional three-bed system was 2.02 kg. NaOH per cycle (resin volume: 7.2 liters; regeneration level: 280 g. NaOH/liter resin). This means that the new three-bed system achieved a saving of 0.88 kg. of NaOH in the regenerant requirement (which is equivalent to a 43.5% saving) in comparison with the requirements of a conventional three-bed system. In addition, the new three-bed system led to a saving of 1.1 liters in the volume of weakly basic anion exchange resin (or a saving of 8.1% in comparison with the conventional system). A modest saving was also made in the volume of the Type I resin (amounting to approximately 1.4% in comparison with the requirements of the conventional system).

EXAMPLE 3

The experiments of both Examples 1 and 2 are repeated, but in each case the portion of effluent from the cation exchanger which is passed through the weakly basic exchanger is little more than 50% of the total, and the balance is sent directly to merge into stream 50 together with the effluent from the weak base exchanger before the mixture is sent through the strong base exchanger. In each case, the results are analogous to the results of the previous examples, in each instance comparing favorably with corresponding treatments using the conventional three-bed system of the prior art.

We claim:

1. In a process for deionizing raw water containing relatively greater amounts of various mineral acid anions and lesser amounts of silica ions which consists essentially of passing water to be treated into contact with a strongly acidic cation exchanger, then passing the water into contact with a weakly basic anion exchanger, and next passing the water into contact with a Type I strongly basic anion exchanger, the improvement which consists in dividing the effluent from the cation exchanger into major and minor portions, passing the major portion into contact with the weakly basic resin, mixing the effluent which has been contacted with the weakly basic exchanger together with said minor portion in such proportions that the ratio of silica ions to mineral acid anions in the thus formed mixture is within the range of from 6/4 to 9.8/0.2, and passing the mixture into contact with the strongly basic anion exchanger, the final effluent from the strongly basic anion exchanger being highly purified, highly deionized water.

2. The process of claim 1 in which the cation exchanger is a sulfonic acid type resin in the H+ form, the weakly basic anion exchanger is a polyamine type resin in the OH− form, and the strongly basic anion exchanger resin is one which has trialkylammonium functional groups.

3. The process of claim 1 in which the ratio of silica ions/mineral acid anions is within the range of from 8.0/2.0 to 9.5/0.5.

4. The process of claim 1 in which the ratio of the major effluent portion to the minor effluent portion is such that the mixture of water streams fed into contact with the strongly basic anion exchanger has an anionic composition corresponding to about 10% mineral acid anions the balance being silica ions.

References Cited

UNITED STATES PATENTS

| 3,197,401 | 7/1965 | Arai | 210—37 X |
| 3,388,059 | 6/1968 | Wirth | 210—37 X |
| 3,458,438 | 7/1969 | Smith et al. | 210—37 X |

REUBEN FRIEDMAN, Primary Examiner

T. G. WYSE, Assistant Examiner

U.S. Cl. X.R.

210—38